United States Patent [19]

Retallick

[11] Patent Number: 4,831,009

[45] Date of Patent: May 16, 1989

[54] METHOD OF APPLYING A CATALYST TO A SUPPORT

[75] Inventor: William B. Retallick, West Chester, Pa.

[73] Assignee: W. R. Grace & Co.-Conn., New York, N.Y.

[21] Appl. No.: 189,122

[22] Filed: May 2, 1988

Related U.S. Application Data

[62] Division of Ser. No. 31,275, Mar. 30, 1987, Pat. No. 4,762,567.

[51] Int. Cl.$^4$ .................. B01J 21/04; B01J 23/42; B01J 23/44; B01J 23/46
[52] U.S. Cl. ................... 502/334; 502/332; 502/333; 423/213.5
[58] Field of Search ............. 502/332, 333, 334; 423/213.5

[56] References Cited

U.S. PATENT DOCUMENTS

| | | | |
|---|---|---|---|
| 3,554,929 | 1/1971 | Aarons | 502/332 X |
| 3,939,104 | 2/1976 | Campbell et al. | 423/213.5 X |
| 4,091,072 | 5/1978 | McArthur | 502/326 X |
| 4,757,045 | 7/1988 | Turner et al. | 502/332 X |

Primary Examiner—W. J. Shine
Attorney, Agent, or Firm—Steven T. Trinker

[57] ABSTRACT

There is provided a washcoat for applying a catalyst coating to a catalyst support. The washout includes alumina and a catalyst metal from the platinum group. Thus, the alumina and the catalyst metal are applied to the support in a single coating. The invention also includes a method of making the washcoat. The washcoat made by the present invention is economical to apply, and it has the additional advantage that it adheres tightly to a metal support.

11 Claims, No Drawings

METHOD OF APPLYING A CATALYST TO A SUPPORT

This is a division of application Ser. No. 031,275, filed Mar. 30, 1987, now U.S. Pat. No. 4,762,567.

BACKGROUND OF THE INVENTION

This invention relates to a washcoat for applying a catalyst coating to a catalyst support, especially a metal catalyst support. The metal support is usually in the form of a honeycomb which has passages for the flow of gas. The metal honeycomb is used in catalytic converters for automobiles and in catalytic incinerators, which burn out pollutants in a stream of air.

A metal having a composition suitable for a catalyst support is described in U.S. Pat. No. 4,601,999. Metal honeycombs suitable for catalytic converters are described in U.S. Pat. Nos. 4,576,800 and 4,598,063 and U.S. patent application Ser. No. 905,071, now U.S. Pat. No. 4,673,553, entitled "Metal Honeycomb Catalyst Support Having a Double Taper". The cited patents and the cited application are hereby incorporated by reference into this disclosure.

The present washcoat includes alumina and also the catalyst metal, so that the catalyst coating is applied in a single step. The washcoat is intended especially for catalytic converters for automobiles.

SUMMARY OF THE INVENTION

This invention relates to a washcoat for applying a catalyst coating to a catalyst support, especially a metal support. The washcoat is intended especially for catalytic converters for automobiles.

The washcoat comprises alumina, a major portion of which has been calcined at a higher temperature, and a minor portion of which has been calcined at a lower temperature. The use of aluminas which have been calcined at two different temperatures has several advantages. The washcoat has a high solids content, a low viscosity, and it dries to a smooth, tightly-adhering coating without cracks.

The washcoat includes the catalyst metal, such as platinum, palladium, or rhodium. Because of this arrangement, the catalyst coating can be applied to the support in a single step.

The catalyst metals are dispersed on the alumina in a novel way, which leads to high dispersion of the metals and to high catalytic activity.

The invention also includes a method of making the washcoat. According to this method, a first quantity of alumina is calcined at a temperature in the range of about 700°–900° C. A catalyst metal is dispersed into this quantity of alumina by forming a slurry of the alumina, adding a solution of a salt of the catalyst metal, and adding a reducing agent to the slurry, so that substantially all of the catalyst metal in the solution is reduced. The resulting suspension is combined with a second quantity of alumina, which has been calcined at a temperature in the range of about 400°–500° C. The second quantity is smaller than the first quantity. For example, the first quantity can be at least three times the second quantity. The resulting mixture is milled in the presence of water and an acid, to form the washcoat. The washcoat can then be applied to the catalyst support in one step.

It is therefore an object of this invention to provide a washcoat that adheres tightly to a metal support.

It is another object to provide a washcoat suitable for catalytic converters for automobiles.

It is another object to provide a washcoat that includes the catalyst metal.

It is another object to provide a method for dispersing a platinum group metal on alumina.

It is another object to provide a method for applying a catalyst to a catalyst support.

Other objects and advantages of the invention will be apparent to those skilled in the art, from a reading of the following detailed description of the invention, and the appended claims.

DETAILED DESCRIPTION OF THE INVENTION

There is provided a washcoat for applying a catalyst coating to a catalyst support, especially a metal catalyst support. One advantage of this washcoat is that it adheres tightly to a metal support. It is more difficult to make washcoat adhere to metal than to ceramic because the metal surface is smooth and has little or no porosity. What is needed is a washcoat that dries to a hard, continous film, without cracks. This, in turn, requires a washcoat that has a high content of alumina, and yet is not too viscous or thixotropic. This objective is accomplished by making the washcoat of a major portion of alumina that has been calcined at a higher temperature, and a minor portion of alumina that has been calcined at a lower temperature. A typical composition that satisfies these requirements is, in parts by weight:

20 alumina calcined at 400°–500° C.
80 alumina calcined at 700°–900° C.
7 concentrated nitric acid
120 water This composition is milled in a ball mill or a colloid mill. The product is a washcoat of the present invention. When the washcoat is dried and calcined, the weight loss is about 57%, so that the content of calcined solids in the washcoat is about 43%. The specific gravity of the washcoat is about 1.6. The viscosity is about 30 centipoise.

A satisfactory starting alumina for making this washcoat is Disperal, supplied by Condea Chemie GmbH, of West Germany. This is an alpha monohydrate ($Al_2O_3 \cdot H_2O$) that contains additional water of hydration. The result of calcining Disperal at different temperatures is:

| Calcining Temperature (°C.) | Weight Loss, % | Surface Area of Calcined Disperal (m²/g) |
|---|---|---|
| 400 | 9.5 | 145 |
| 460 | 10.9 | 135 |
| 500 | 11.9 | 150 |
| 760–800 | 22.8–23.3 | 125 |
| 970 | 22.9 | 100 |

A temperature of 760°–800° C. is sufficient to drive off all of the water of hydration, and the surface area has begun to decline because of sintering. Disperal that has been calcined at only 400°–500° C. does retain some water of hydration. It is this hydrated alumina that reacts most readily with the nitric acid in the washcoat. During the ball milling, the hydrated alumina is partially peptized.

The peptized alumina becomes the glue that makes the calcined washcoat bind to a surface. Another function of the peptized alumina is to keep all of the solids in the washcoat in suspension.

It is possible to make a washcoat wherein the minor portion of alumina is not calcined at all. A disadvantage of such a washcoat is that the content of calcined solids is limited to about 36%. At higher contents of solids, the viscosity is so high that the energy input to the ball mill is dissipated in viscous shear instead of in grinding. Even at 36% solids, the higher viscosity makes it difficult to spread the washcoat uniformly on a strip of metal. This can be remedied by diluting the washcoat with water, to a solids content of about 33%.

When the washcoat is thus diluted, another difficulty appears. The film of washcoat shrinks excessively upon drying, generating "mud cracks", and invites spalling of the dried washcoat.

To summarize, by calcining the minor portion of alumina in the washcoat at about 400°–500° C., the following benefits are obtained:

1. The washcoat has a lower viscosity at a higher solids content.
2. The washcoat spreads more uniformly on a metal surface.
3. The washcoat dries to an unbroken film without mud cracks.
4. When a heavy coating of alumina is needed, of about 40 milligrams per square inch, this loading is obtained with fewer coatings of washcoat.

The alumina that is calcined at the higher temperature need not be from the same source as the alumina that is calcined at the lower temperature. The alumina that is calcined at the lower temperature must be a dispersible alumina. Disperal is a dispersible alumina, and the name Disperal is intended to imply dispersibility. Another dispersible alumina is Versal 950, supplied by Kaiser Aluminum and Chemical Corp. Kaiser and Condea have similar tests for measuring the dispersibility of an alumina. In Kaiser's test, a water slurry of alumina is made that contains 5% of $Al_2O_3$. Nitric acid is added in the amount of 0.25 equivalents of acid per 100 grams of $Al_2O_3$. The acidified slurry is mixed in a high-shear mixer, for five minutes. The mixed slurry is centrifuged to settle out the particles larger than one micron. The remaining colloidal suspension is dried and calcined to $Al_2O_3$. This weight is divided by the weight that would have been obtained by calcining the original sample. This gives the percentage dispersibility. The dispersibility of Versal 950 and of Disperal is about 95%. Both of these can be used for the alumina that is calcined at the lower temperature. After being calcined at the lower temperature, they will be less dispersible. Even so, to make the washcoat of this invention, the alumina that is calcined at the lower temperature must have a dispersibility above about 80%. The alumina that is calcined at the higher temperature must have a dispersibility above about 50%.

Another feature of the washcoat of this invention is that it contains the catalyst metal already dispersed on the alumina. It has been common practice to coat the catalyst support first with a washcoat of alumina. The washcoat is dried and calcined, and then the coated support is dipped in a solution of the catalyst metal. This step is followed by another step of drying and calcining to decompose the salt of the catalyst metal. By contrast, in the present invention, wherein the washcoat contains the catalyst metal, the catalyst coating is applied with just one coating step and one step of drying and calcining. This feature is particularly advantageous when the catalyst support is metal. A moving strip of metal is coated continuously before it is formed into the honeycomb which becomes the catalytic converter.

According to this invention, the catalyst metal is dispersed on the alumina before the alumina is ball milled to make the washcoat. The method of dispersing the catalyst metal on the alumina is part of this invention. Two features of the method are:

1. The salt of the catalyst metal can be the chloride, which is the cheapest salt of platinum, palladium, or rhodium.
2. The surface of the alumina participates in the reduction of the metal or catalyzes the reduction, so that the reduction occurs on, and only on, the surface of the alumina. This leads to a high dispersion of the catalyst metal on the alumina, which in turn generates high catalytic activity.

It is a significant feature of the invention that the catalyst metal is reduced from its salt, on the surface of the alumina. For example, the reduction of platinum from the chloride can proceed according to one of the following reactions:

$$H_2PtCl_6 + NH_2NH_2 \rightarrow Pt + N_2 + 6HCl$$

$$H_2PtCl_4 + (\tfrac{1}{2})NH_2NH_2 \rightarrow Pt + (\tfrac{1}{2})N_2 + 4HCl$$

If a solution of $H_2PtCl_6$ or $H_2PtCl_4$ is mixed with a solution that contains the theoretical amount of hydrazine needed to reduce the platinum, or even a small excess of hydrazine over this amount, there is no reduction if the mixed solution is sufficiently dilute. But, when this mixed dilute solution is poured into a slurry of alumina in water, the reduction proceeds immediately on the surface of the alumina. The reduction is indicated by the color of the alumina, which changes from white to black or gray. When the platinum solution is added first to the alumina, followed by the hydrazine, the same color change is observed, although sometimes with a time lag. The same is observed when the hydrazine is added first, followed by the platinum.

Palladium is reduced by the reaction:

$$H_2PdCl_4 + (\tfrac{1}{2})NH_2NH_2 \rightarrow Pd + (\tfrac{1}{2})N_2 + 4HCl$$

The observations with palladium are the same as with platinum.

Rhodium is reduced by the reaction:

$$RhCl_3 + (\tfrac{3}{4})NH_2NH_2 \rightarrow Rh + (\tfrac{3}{4})N_2 + 3HCl$$

The reduction of rhodium is not spontaneous as it is with platinum or palladium, and the reduction needs some urging. The slurry of alumina, with the $RhCl_3$ and $NH_2NH_2$, is warmed to about 50° C. and then the pH is raised with an alkali such as $NH_4OH$ to start the reduction.

After the catalyst metal has been reduced on the surface of the alumina, the alumina is washed on a filter or in a centrifuge until the washings are substantially free of chloride ion. Then the wet filter cake is charged directly to the ball mill; there is no need to dry the cake.

The catalyst metal can be dispersed only on the major portion of the alumina which has been calcined at the higher temperature, or on both portions combined. It is preferred to disperse the metal only on the alumina that has been calcined at the higher temperature because the surface area of this alumina has already been reduced by a partial sintering. It is less susceptible to further sintering later on in the catalytic converter. The minor portion of alumina, calcined at only 400°–500° C., will suffer some sintering in use, and sintering closes pore mouths and buries some of the metal crystallites.

Cerium oxide is a component of "three way" automobile catalysts that are used to reduce nitrogen oxides as well as to oxidize hydrocarbons and carbon monoxide. Cerium oxide may be included in the washcoat by subtracting out an approximately equal weight of the major portion of alumina.

EXAMPLE 1

This experiment shows that platinum can be made to reduce on the surface of alumina. Five grams of gamma alumina powder was slurried in about 25 grams of water. A solution was prepared that contained 0.075 grams of platinum as $H_2PtCl_6$ and 0.0404 grams of hydrazine dihydrochloride, $NH_2NH_22HCl$, which is just enough to reduce all of the platinum to the metal. The weight of this solution was about 10 grams. The slurry of alumina was stirred while the solution was added a drop at a time. Reduction occurred immediately as the drops fell upon the alumina, as shown by the alumina changing from white to black. The solution that contained the $H_2PtCl_6$ and the $NH_2NH_2.2HCl$ was transparent pale yellow. This solution remained clear and transparent until it fell upon the alumina. That is, there was no reduction until the solution met the alumina.

EXAMPLE 2

The experiment of Example 1 was repeated with other surfaces substituted for the gamma alumina:

| Substrate | Surface Area (m²/g) | Result |
| --- | --- | --- |
| Silica | 200 | No reduction |
| Titanium oxide | unknown | No reduction |
| Cerium oxide | 128 | No reduction |
| Carbon | 1020 | Complete reduction |

The carbon, of course, was black at the beginning. But the color of the solution turned from yellow to colorless, indicating complete reduction.

EXAMPLE 3

The experiment of Example 1 was repeated with the difference that the solution of $H_2PtCl_6$ and $NH_2NH_2.2HCl$ contained only half of the original amount of $NH_2NH_2.2HCl$. That is, it contained only enough $NH_2NH_2.2HCl$ to reduce half of the platinum. The alumina darkened slowly and the final color was gray, not black. When the slurry was allowed to settle, the supernatant solution was pale yellow, indicating the presence of unreduced platinum. When more $NH_2NH_2.2HCl$ was added, the alumina darkened and the yellow color disappeared. This experiment confirms, again, that the reduction occurs on the surface of the alumina.

EXAMPLE 4

The experiment in Example 1 was repeated with the difference that the solution of $H_2PtCl_6$ and of $NH_2.2HCl$ were not mixed together, but instead they were added separately to the slurry of alumina. The result was the same whether the $H_2PtCl_6$ or the $NH_2NH_2.2HCl$ was added first. The alumina did not begin to darken until about five minutes after the second solution had been added. Then the alumina darkened gradually over a period of about two minutes. The final color of the alumina was light gray instead of black. This suggests that the platinum had time to distribute itself over the area within the particles of alumina powder before the reduction started.

EXAMPLE 5

The purpose of this experiment was to confirm the observation of Example 4, that when the solutions of $H_2PtCl_6$ and $NH_2NH_2.2HCl$ are added to the alumina separately, the platinum has time to distribute itself inside of the alumina particles. The alumina was in the form of beads having a diameter of about 3 mm, instead of a powder. The beads could not form a slurry, but instead they were covered with water. When the solution of $H_2PtCl_6$ was added first, and later the $NH_2NH_2.2HCl$ was added separately, the beads did not start to darken for about 15 minutes. When the darkening was complete, the beads were split. There was a darkened surface shell having a thickness of about one tenth of the diameter of a bead.

When the solutions were mixed and then added to the beads, the beads started to darken within 12 seconds. Splitting the beads revealed a surface shell that had no perceptible thickness at all. The platinum was confined to the outermost surface of the bead.

EXAMPLE 6

The purpose of this experiment was to demonstrate the reduction of palladium on the surface of alumina. Three grams of powdered gamma alumina was slurried in about 20 grams of water. A solution was prepared that contained 0.045 g of palladium as $H_2PdCl_4$ and 0.0221 g $NH_2NH_2.2HCl$, which is just enough to reduce all of the palladium to the metal. The weight of this solution was about 10 grams. The slurry of alumina was stirred and the solution was added, a drop at a time. Reduction started when the first drops fell upon the alumina.

EXAMPLE 7

The experiment of Example 6 was repeated with the difference that the solution of $H_2PdCl_4$ was added first to the slurry of alumina, followed by the solution of $NH_2NH_2.2HCl$. The alumina began to darken within about one second after the addition of $NH_2NH_2.2HCl$ started.

EXAMPLE 8

Platinum of valence 4 was reduced to platinum of valence 2 by the reaction

$$H_2PtCl_6 + (\tfrac{1}{2})NH_2NH_2.2HCl \rightarrow H_2PtCl_4 + (\tfrac{1}{2})N_2 + 3HCl$$

The $H_2PtCl_6$ was in a concentrated solution that contained about 5%, by weight, of platinum. The $NH_2NH_2.2HCl$ was added as the solid salt, a little at a time. Reduction is complete when the evolution of nitrogen gas stops.

The previous examples cited solutions that contained both $H_2PtCl_6$ and $NH_2NH_2.2HCl$, and there was no reduction of the platinum in those solutions. The reason is that reduction occurs only at the much higher concentration in this Example 8.

EXAMPLE 9

The purpose of this experiment was to demonstrate the reduction of platinum from $H_2PtCl_4$. Ten grams of gamma alumina powder was slurried in about 40 grams of water. A solution was prepared that contained 0.105 grams of platinum, as $H_2PtCl_4$. Another solution contained 0.030 grams of $NH_2NH_2.2HCl$. The slurry of alumina was stirred. Each solution was added a drop at a time. The $H_2PtCl_4$ was added first. Reduction started when the first drops of $NH_2NH_2.2HCl$ solution fell upon the alumina.

The experiment was repeated and the solutions of $H_2PtCl_4$ and $NH_2NH_2.2HCl$ were mixed together. The mixed solution weighed about 10 grams. When this solution was added to the slurry of alumina, drop by drop, reduction started when the first drops fell upon the alumina.

EXAMPLE 10

The purpose of this experiment was to scale up the reduction demonstrated in Example 9, and to produce a catalyst coating whose activity could be tested in a later example. The alumina powder used here was made by calcining Disperal, which is an alpha monohydrate, $Al_2O_3.H_2O$, that contains additional water of hydration. It is supplied by Condea Chemie GmbH, of West Germany. The gamma alumina that was impregnated with platinum was made by calcining Disperal at 780° C. for two hours. The weight loss upon calcining was 22.8%, which indicates that all of the water was evolved. The product is gamma alumina having a surface area of about 125 $m^2/g$. Fifty grams of this gamma alumina was slurried in about 200 g of water. The slurry was stirred while a solution of $H_2PtCl_4$ that contained 0.52 g of platinum was added a drop at a time. Then a solution that contained 0.15 g of $NH_2NH_2.2HCl$ was added a drop at a time. This is about 110% of the weight of $NH_2NH_2.2HCl$ needed to reduce all of the platinum. The alumina started to turn black within seconds after starting the addition of the $NH_2NH_2.2HCl$. After all of the $NH_2NH_2.2HCl$ had been added, and the reduction was complete, ammonium hydroxide was added to raise the pH of the slurry to about 8. Raising the pH causes the alumina to settle rapidly and leave a supernatant solution that is clear and not fogged by peptized alumina. This also speeds the filtration in the next step.

The alumina, now impregnated with 1.04% of platinum, was washed on a filter until the filtrate was free of chloride ion, as shown by the absence of a precipitate when silver nitrate was added to the filtrate. The wet filter cake weighed 102 g. It was charged directly to a ball mill without drying. The filter cake that was charged to the ball mill was assumed to contain 48 g of alumina, to allow for a 2 g loss during filtering and recovering the cake from the filter.

The charge to the ball mill had the following compositon:

| Weight, grams | Component |
| --- | --- |
| 48.0 | Assumed recovery of the starting alumina |
| 17.3 | Alumina made by calcining Disperal at 400° C. |
| 20.9 | Cerium oxide |
| 5.7 | Concentrated (70%) nitric acid |
| 53 | Water in addition to the |

-continued

| Weight, grams | Component |
| --- | --- |
| | water in the filter cake |

The alumina made by calcining Disperal at 400° C. is not completely dehydrated. The weight loss upon calcining was 9.5%, as compared with a 22.8% loss upon complete dehydration at 780° C. The incompletely dehydrated alumina is partly peptized by the nitric acid, and thereby forms the "glue" that makes this catalyst coating adhere to metal.

The cerium oxide is a component of a three-way automobile catalyst. The composition of the exhaust gas alternates between an excess of oxidants, $O_2$ and $NO_x$, and an excess of reductants, hydrocarbons, and CO. The cerium alternates between $Ce_2O_3$ and $CeO_2$, whereby it stores up oxygen during the oxidizing half cycle and releases this oxygen during the reducing half cycle. The cerium oxide used here has an area of about 125 $m^2/g$.

This charge was ball milled for 4.7 hours. The product is a washcoat that forms the catalyst coating of this invention. It is a stable suspension; some solids will settle out over a period of weeks, but no faster than that. The specific gravity is about 1.6. The percentage, by weight, of solids that remain after drying and calcining is about 45%. The adherence of the catalyst coating was tested in the following way. A strip of metal foil having a thickness of 0.0025 inches and having the composition of U.S. Pat. No. 4,601,999 was coated with washcoat. Four coatings were applied with a brush. Each coating was dried and calcined before the next coating was applied. After the fourth coating, the loading of calcined catalyst coating on the strip was 49 milligrams per square inch. The strip was penetrated with fine shot from a 0.22 caliber shot cartridge. The coating adhered to the strip right up to the periphery of the shot holes, which is an indication of good adherence.

EXAMPLE 11

The purpose of this example is to demonstrate the reduction of rhodium on the surface of alumina. This example includes three experiments. In each experiment, 3.0 g of gamma alumina (Disperal calcined at 780° C.) was slurried in about 20 g of water. A solution of $RhCl_3$ that contained 0.0312 g of rhodium was added with mixing. Then a solution containing 0.0239 g $NH_2NH_2.2HCl$ was added. This is just enough $NH_2NH_2.2HCl$ to reduce all of the metal. Unlike the case of platinum or palladium, the reduction of rhodium does not start immediately, but instead it needs some urging. The slurry was warmed slowly while mixing. Then $NH_4OH$ was added to raise the pH. The only difference among the three experiments was the temperature at which $NH_4OH$ was added to raise the pH.

Here are the results:

| Temperature at which $NH_4OH$ was added (°C.) | Result |
| --- | --- |
| 40 | Started to darken at 47° C., darkening complete at 54° C. |
| 50 | Darkened immediately |
| 62 | Darkened immediately |

EXAMPLE 12

The purpose of this experiment was to scale up the reduction of rhodium demonstrated in Example 11, and to produce a catalyst coating whose activity could be tested in a later example. The alumina powder that was impregnated with rhodium was the same as in Example 10, namely Disperal calcined at 780° C. Fifty grams of this alumina was slurried in about 200 grams of water. A solution of $RhCl_3$ that contained 0.52 g of rhodium was added, followed by a solution that contained 0.40 g of $NH_2NH_2.2HCl$. This is just enough $NH_2NH_2.2HCl$ to reduce all of the rhodium. The slurry was heated and stirred. Here are the results:

| Minutes of Heating | Temp (°C.) | Observation |
|---|---|---|
| 0 | 25 | |
| 4 | 35 | |
| 7 | 48 | |
| 9 | 56 | The red color of $RhCl_3$ is turning to yellow |
| 12 | 61 | Darkening slowly |
| 13 | 64 | Almost completely darkened |
| 14 | 66 | Darkening complete |

There was no need to raise the pH. The reduction occured anyway. The alumina, now impregnated with 1.04% of rhodium, was washed free of chloride ion, and charged to a ball as in Example 10. The charge to the ball mill was:

| Weight, grams | Component |
|---|---|
| 48.0 | Assumed recovery of the starting alumina |
| 17.3 | Alumina made by calcining Disperal at 400° C. |
| 20.9 | Cerium oxide |
| 5.7 | Concentrated nitric acid |
| 50 | Water in addition to the water in the filter cake |

The milling time was 4.1 hours. The adherence of the washcoat was proved by the method of Example 10.

EXAMPLE 13

The purpose of this experiment was to scale up the reduction of palladium demonstrated in Example 7, and to produce a catalyst coating whose activity could be tested in a later example. The alumina that was impregnated with palladium was the same as in Examples 10 and 12, Disperal calcined at 780° C. Fifty grams of this alumina was slurried in about 200 grams of water. A solution of $H_2PdCl_4$ that contained 0.52 grams of palladium was added, followed by a solution that contained 0.27 grams of $NH_2NH_2.2HCl$. This is 105% of the amount needed to reduce all of the palladium. The $NH_2NH_2.2HCl$ solution was added with a dropper. The reduction started as soon as the first drops of $NH_2NH_2.2HCl$ fell upon the alumina. The alumina, now impregnated with 1.04% of palladium, was washed and charged to a ball mill as in Example 10 and 12. The charge to the ball mill was the same as before. The adherence of this washcoat to a metal strip was proved by the method of Example 10.

EXAMPLE 14

This experiment was almost a duplicate of Example 10. The only difference was that $NaHCO_3$ was added to the slurry of alumina to react with the HCl that is produced in the reduction step. As before, 50 grams of alumina was slurried in about 200 grams of water. Then 1.88 grams of $NaHCO_3$ was added to the slurry. This is 105% of the amount needed to neutralize the HCl. Then the solutions of $H_2PtCl_4$ and of $NH_2NH_2.2HCl$ were added as in Example 10. The reduction started when the first drops of $NH_2NH_2.2HCl$ fell upon the alumina. After the reduction, the pH was about 7, as compared with about 3–4 in the absence of $NaHCO_3$.

The charge to the ball mill was the same as in Example 10. The milling time was 4.7 hours. The adherence of the washcoat was proved by the method of Example 10.

EXAMPLE 15

Prior to the present invention, my preferred method for applying a catalyst coating to a metal support was to coat the support in two steps. First, the support was coated with a washcoat of alumina that contained no catalyst metal. Then, the alumina was impregnated with platinum from a solution of $[Pt(NH_3)_4](OH)_2$, platinum tetrammine dihydroxide. To make this platinum precursor, $H_2PtCl_4$ is converted to $[Pt(NH_3)_4]Cl_2$, and then the chloride ions are replaced by hydroxide ions by ion exchange. This platinum precursor is expensive, but it decomposes upon heating without leaving any residue in the alumina coating, so that the catalyst coating has high activity. The purpose of this Example 15 was to impregnate alumina powder with this pretested platinum precursor, and to make a washcoat that would serve as a a standard of comparison for the other washcoats produced by the method of this invention.

The alumina that was impregnated with platinum was the same as in Example 10. Fifty grams of this alumina was wetted with 55 grams of solution that contained 0.52 grams of platinum as $[Pt(NH_3)_4](OH)_2$. This was just enough solution to wet the alumina. The alumina was dried and calcined at 400° C. The platinum precursor decomposed and what remained of the precursor was platinum in the form of the metal or the oxide. The calcined alumina was light gray and weighed 50.5 g. The charge to the ball mill was:

| | |
|---|---|
| 50.5 g | impregnated alumina |
| 18.0 | alumina made by calcining Disperal at 400° C. |
| 21.8 | cerium oxide |
| 6.0 | concentrated nitric acid |
| 98 | water |

The charge was milled for 4.0 hours. The adherence of this washcoat was proved by the method of Example 10.

EXAMPLE 16

The purpose of this experiment was to scale up the reduction of platinum demonstrated in Example 4, and to produce a catalyst coating whose activity could be tested in a later example. The alumina powder that was impregnated with platinum was the same as in Example 10. Fifty grams of this alumina was slurried in about 200 grams of water. A solution of $H_2PtCl_6$ that contained 0.52 grams of platinum was added with a dropper, followed by a solution that contained 0.30 grams of NH$_2$NH$_2$.2HCl. This is 107% of the amount needed to reduce all of the platinum. After all additions, the temperature of the slurry was 22° C. The slurry started to darken after 8 minutes, and then darkened rapidly after 10 minutes of stirring. The charge to the ball mill was the same as in Example 10. The milling time was 4.0 hours. The adherence of this washcoat was proved by the method of Example 10.

EXAMPLE 17

The catalyst coatings were tested by painting them onto metal foil having the composition disclosed in U.S. Pat. No. 4,601,999. The strips were corrugated so they could be formed into honeycombs. For these tests, the honeycombs had a length of 0.5 inches, and a diameter of 0.75 inches. An important parameter of the test honeycomb is the loading of catalyst metal, in grams per cubic foot. The loading is controlled by the percentage, by weight, of catalyst metal in the coating, and the weight, per unit area, of the catalyst coating on the metal foil. The coatings made in the foregoing examples were calculated to give a metal loading of 20 grams per cubic foot.

The test results are given in Table I. Table I shows the percentages of hydrocarbons, carbon monoxide, and nitric oxide, respectively, that were converted into carbon dioxide or water, using a catalytic converter made from each sample. The two control samples were made by the technique of the prior art, i.e. by first coating the strip with alumina, calcining the strip, and then impregnating the strip with a solution of platinum tetrammine. The samples made according to the invention were prepared by applying the washcoat which already contained the catalyst metal.

Table I shows that:
1. Palladium in Example 13 has the highest activity, higher than Control II, with more than twice the metal loading.
2. The most active platinum catalyst is made from H$_2$PtCl$_4$, in Examples 10 and 14.
3. Catalysts made with H$_2$PtCl$_4$ are more active than Control I, with the same metal loading.

TABLE I (Example 17)
Testing the Activity of the Catalyst Coatings

| Coating from Example No. | Catalyst Metal | Loading of Catalyst Metal (g/ft$^3$) | Percent Conversion | | | | | | | | |
|---|---|---|---|---|---|---|---|---|---|---|---|
| | | | R = 1.67 | | | R = 0.97 | | | R = 0.67 | | |
| | | | HC | CO | NO | HC | CO | NO | HC | CO | NO |
| 10 and 12 | Platinum and Rhodium | Total loading: 20, Pt/Rh = 5/1 | 85 | 67 | 52 | 72 | 48 | 47 | 65 | 44 | 45 |
| 14 | Platinum (PtCl$_4$) | 20 | 75 | 53 | 34 | 64 | 44 | 36 | 53 | 37 | 33 |
| 16 | Platinum (PtCl$_6$) | 20 | 45 | 26 | 9 | 21 | 12 | 9 | 14 | 12 | 9 |
| 15 | Platinum (Pt(NH$_3$)$_4$) | 20 | 67 | 38 | 22 | 52 | 30 | 17 | 12 | 8 | 8 |
| 13 | Palladium | 20 | 90 | 88 | 57 | 88 | 69 | 63 | 82 | 50 | 60 |
| Control I | Platinum and Rhodium | Total loading: 20, Pt/Rh = 5/1 | 64 | 45 | 40 | 48 | 36 | 33 | 34 | 26 | 2 |
| Control I (Repeat) | | | 64 | 42 | 40 | 47 | 33 | 33 | 35 | 28 | 2 |
| Control II | Platinum and Rhodium | Total loading: 50, Pt/Rh = 5/1 | 86 | 73 | 56 | 79 | 58 | 61 | 74 | 52 | 6 |
| Control II (Repeat) | | | 86 | 64 | 57 | 79 | 50 | 61 | 72 | 44 | 62 |

Note: Before testing, the catalysts were aged 4 hours in air at 980° C.
R = Equivalence ratio, oxidants/reductants
HC = Hydrocarbons
CO = Carbon Monoxide
NO = Nitric Oxide

EXAMPLE 18

This experiment first showed that hydrazine, NH$_2$NH$_2$, reduces platinum just as effectively as the dihydrochloride. Hydrazine is preferred because it introduces less chloride ion that must be washed out. The alumina used here was made by calcining Disperal at 500° C. The weight loss was 11.9%. The area was about 150 m$^2$/g. Eighteen grams of this alumina was slurried in about 100 grams of water. A solution containing 0.19 grams of platinum, as H$_2$PtCl$_6$, was added, followed by a solution that contained 0.033 grams of NH$_2$NH$_2$. This is 107% of the weight needed to reduce the platinum. The temperature of the slurry was 22° C. The reduction was complete after 2.5 minutes. Separate tests showed that hydrazine is effective for reducing rhodium and palladium.

EXAMPLE 19

This is an eight-fold scale up of the production level of Example 10. The weight of alumina powder was 400 grams. It was slurried in about 2000 grams of water. The slurry was stirred rapidly, while a solution that contained 4.16 grams of platinum as H$_2$PtCl$_4$ was added during a period of about 13 minutes. The volume of the solution was about 500 ml. The solution was more dilute than in Example 10, and the time for adding it was longer. The purpose was to avoid even momentary pockets of high concentration platinum in the solution that contacts the alumina, so that the platinum would be dispersed uniformly over all of the particles of the alumina powder. The platinum was reduced with hydrazine instead of the dihydrochloride. Then the pH was raised to about 9 with NH$_4$OH and the slurry was filtered. The alumina was washed on the filter until the filtrate was free of chloride ion. The wet filter cake was charged directly to the ball mill, as before. The charge to the ball mill was:

| | |
|---|---|
| 398 grams | Assumed recovery of the starting alumina |
| 143 | Alumina made by calcining Disperal at 500° C. |
| 174 | Cerium oxide |
| 48 | Concentrated (70%) nitric acid |
| 393 | Water in addition to the water in the filter cake |

The charge was ball milled for six hours. The adherence of the washcoat was proved by the method of Example 10.

EXAMPLE 20

This is a two-fold scale up of the production level of Example 12. The weight of alumina powder was 100 grams. It was slurried in about 400 ml of water. A solution that contained 1.04 grams of rhodium, as $RhCl_3$, was added slowly with a dropper while the alumina slurry was stirred rapidly. The solution of $RhCl_3$ weighed 52 grams. The rhodium was reduced with 0.12 grams of hydrazine, which is just equal to the theoretical amount for complete reduction. The slurry was warmed after the hydrazine was added. Here are the results:

| Minutes of Heating | Temp. (°C.) | pH | Observation |
|---|---|---|---|
| 2 | 22 | 6.2 | |
| 6 | 31 | 6.2 | |
| 8 | 36 | 5.7 | |
| 12 | 46 | 5.4 | |
| 13.5 | 50 | 5.3 | Added $NH_4OH$ to raise the pH |
| 15 | 54 | 8.4 | Slurry is darkening |
| 17 | 56 | 8.1 | |
| 19 | 56 | 7.8 | |
| 21 | 59 | 8.0 | Darkening is complete |

Three 100-gram batches of alumina and one 50-gram batch were impregnated with rhodium in this way. The four batches of impregnated alumina were combined and washed on the filter as before. The charge to the ball mill was:

| | |
|---|---|
| 348 grams | Assumed recovery of the starting alumina |
| 125 | Alumina made by calcining Disperal at 500° C. |
| 153 | Cerium oxide |
| 42 | Concentrated (70%) nitric acid |
| 342 | Water in addition to the water in the filter cake |

The charge was milled for five hours. The adherence of the washcoat was proved by the method of Example 10.

EXAMPLE 21

The washcoats of Examples 19 and 20 were tested by the method of Example 17. The test results are given in Table II. Control III was made in the same way as Controls I and II. The symbols in Table II have the same meaning as in Table I. The "pulsator" mentioned in Table II is an apparatus for aging catalyst in an atmosphere that simulates automobile exhaust. The simulated exhaust contains the expected poisons such as lead and phosphorous.

TABLE II
(Example 21)
Testing the Activity of the Catalyst Coatings

| Coating from Example No. | Conditioning of Catalyst Before Test | Percent Conversion | | | | | | | | |
|---|---|---|---|---|---|---|---|---|---|---|
| | | R = 1.7 | | | R = 0.97 | | | R = 0.70 | | |
| | | HC | CO | NO | HC | CO | NO | HC | CO | NO |
| 19 and 20 | Fresh | 98 | 97 | 67 | 98 | 95 | 97 | 84 | 68 | 86 |
| Control III | | 96 | 92 | 65 | 96 | 90 | 89 | 94 | 82 | 93 |
| 19 and 20 | Aged 4 hours in air at 980° C. | 80 | 64 | 48 | 71 | 50 | 47 | 61 | 43 | 45 |
| Control III | | 65 | 46 | 44 | 47 | 36 | 32 | 28 | 21 | 33 |
| 19 and 20 | Aged 45 hours on a pulsator | 93 | 91 | 66 | 90 | 71 | 75 | 84 | 57 | 75 |
| Control III | | 91 | 91 | 63 | 90 | 78 | 73 | 86 | 63 | 79 |

Note: Loading of the catalyst metal is 20 grams per cubic foot
Platinum/Palladium ratio is 5/1

EXAMPLE 22

The purpose of this experiment was to learn how the alumina surface might be participating in the reduction of the catalyst metals. A solution was prepared that contained $7.7 \times 10^{-4}$ gram mol of platinum as $H_2PtCl_6$ and $8.1 \times 10^{-4}$ gram mol of $NH_2NH_2 \cdot 2HCl$, a 5% excess. The weight of the solution was about 20 grams. The temperature was 16° C. Another solution contained 1% by weight of $NaHCO_3$. The solution of $H_2PtCl_6$ and $NH_2NH_2 \cdot 2HCl$ was stirred while $NaHCO_3$ was being added. Here are the results:

| Moles of $NaHCO_3$ added ($\times 10^{-4}$) | pH of the solution | Observation |
|---|---|---|
| 0 | 1.40 | |
| 2.4 | 1.34 | |
| 12.9 | 1.47 | |
| 16.3 | 1.54 | |
| 25.0 | 1.74 | |
| 30.3 | 1.96 | |
| 36.6 | 2.32 | The solution is still yellow, but it is darkening |
| 40.0 | 2.66 | |
| 44.1 | 4.04 | |
| 45.2 | 4.59 | |
| 46.3 | 4.86 | A colloidal precipitate is forming; solution is darkening more |
| 48.5 | 4.80 | |
| | 4.40 | Solution is becoming opaque black |

The pH began to fall, indicating more rapid reduction, even before the final addition of NaHCO$_3$. After the final addition of NaHCO$_3$, the pH continued to decline for about an hour, and stabilized at about 2.7. The reduction supplies the acid that lowers the pH:

$$H_2PtCl_6 + NH_2NH_2 \cdot 2HCl \rightarrow Pt + N_2 + 8HCl$$

Once the reaction is started, it goes to completion, even though the acidity increases. In dispersing platinum metals on alumina, the role of the surface may be to provide sites of high pH to start the reaction, which is then confined to the surface.

While the invention has been described with respect to the particular embodiments mentioned above, it is understood that the invention can be modified. Such modifications are to be deemed within the spirit and scope of the following claims.

What is claimed is:

1. A method of applying a catalyst to a catalyst support, comprising the steps of:
   (a) calcining a first quantity of alumina, at a temperature in the range of about 700°–900° C.,
   (b) dispersing a catalyst metal into said first quantity of alumina,
   (c) calcining a second quantity of alumina, at a temperature in the range of about 400°–500° C.,
   (d) milling the first and second quantities of alumina together, in the presence of water and an acid, to form a washcoat,
   (e) applying the washcoat to the catalyst support.

2. The method of claim 1, wherein the first quantity is greater than the second quantity.

3. The method of claim 2, wherein the first quantity is at least three times the second quantity.

4. The method of claim 1, wherein the catalyst support is made of metal.

5. The method of claim 1, wherein the catalyst metal is selected from the group consisting of platinum, palladium, and rhodium.

6. The method of claim 1, wherein the dispersing step comprises the steps of forming a slurry of said first quantity of alumina with water, adding to the slurry a solution of a salt of the catalyst metal, and adding a reducing agent to the slurry.

7. The method of claim 6, wherein the quantity of the reducing agent is sufficient to reduce all of the catalyst metal in the slurry.

8. The method of claim 6, wherein the dispersing step further comprises washing the products of the reduction out of the slurry.

9. The method of claim 6, wherein the salt of the catalyst metal is H$_2$PtCl$_4$.

10. The method of claim 1, wherein the second quantity of alumina is a monohydrate having a dispersibility of at least about 80%.

11. A method of applying a catalyst to a catalyst support, comprising the steps of:
    (a) calcining a first quantity of alumina, at a temperature in the range of about 700°–900° C.,
    (b) dispersing a catalyst metal into said first quantity of alumina,
    (c) providing a second quantity of alumina which has not been calcined,
    (d) milling the first and second quantities of alumina together, in the presence of water and an acid, to form a washcoat, and
    (e) applying the washcoat to the catalyst support.

* * * * *